Jan. 24, 1967  R. A. CONNER  3,299,518
GAUGE FOR MEASURING HEIGHT OF STRINGS
FROM FINGERBOARD OF STRINGED
MUSICAL INSTRUMENTS
Filed June 15, 1965
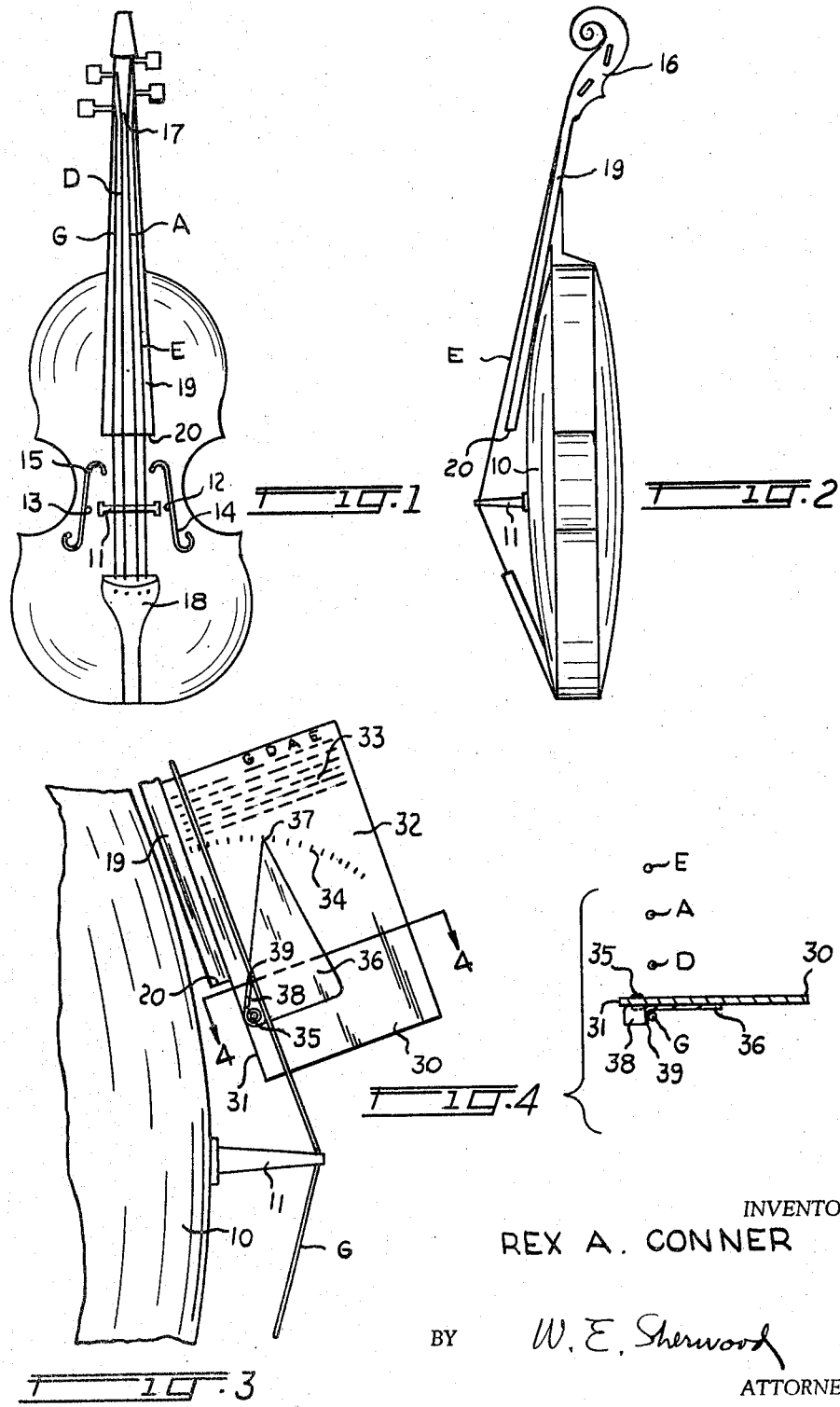
INVENTOR
REX A. CONNER
BY  W. E. Sherwood
ATTORNEY

United States Patent Office 3,299,518
Patented Jan. 24, 1967

3,299,518
GAUGE FOR MEASURING HEIGHT OF STRINGS FROM FINGERBOARD OF STRINGED MUSICAL INSTRUMENTS
Rex A. Conner, Lexington, Ky., assignor, by mesne assignments, to The University of Kentucky Research Foundation, Lexington, Ky., a corporation of Kentucky
Filed June 15, 1965, Ser. No. 464,022
1 Claim. (Cl. 33—172)

This invention relates to an accessory for use by musicians or other personnel engaged in the repair of stringed musical instruments, and more particularly to a gauge for measuring the height of strings from the fingerboard of stringed musical instruments.

In the family of stringed instruments such as violins, violas, celli, string basses and the like wherein the conventional strings are suspended over a bridge and pass above the fingerboard, it is quite important that the strings be positioned at respective predetermined heights from that fingerboard. When, for example, the bridge is accidentally broken, or becomes warped, or needs adjustment because of temperature changes or other reasons, the musician usually is compelled to seek the services of skilled instrument repairmen who employ specialized tools and experience in making such repairs. In many cases, however, the musician himself could effect such repair or adjustment if he had simple instructions and a convenient accessory for measuring the height of the strings from the fingerboard of his instrument.

An object of the present invention is to provide a simple, inexpensive and accurate gauge for measuring the heights of strings from the fingerboard of stringed musical instruments.

Another object is to provide a gauge having information as to optimum string heights arranged thereon in convenient visual relation to the means for reading a measurement being taken.

These and other objects of the invention will become more apparent as the description proceeds and when considered in conjunction with the accompanying drawing in which FIG. 1 is front elevation of a musical instrument, illustrated as a violin, with which the gauge is adapted to be used.

FIG. 2 is a side elevation of the instrument shown in FIG. 1.

FIG. 3 is a fragmentary view, to an enlarged scale, showing the gauge in position during a measuring operation, and FIG. 4 is a sectional view through the gauge taken on line 4—4 of FIG. 3.

In accordance with the invention the gauge includes a narrow flat member having an exposed face on which an arcuate scale is located and with a narrow arm pivoted to the member and having a pointer which traverses that scale. The dimensions of the gauge are such as to enable it to fit between adjacent strings of various forms of instruments, and the face of the gauge provides adequate space for displaying a chart showing the optimum string heights for a variety of such instruments to the end that the user may employ the same gauge for many instruments and may make an easy comparison between the measurement being taken and the chart which shows the optimum dimension desired.

Referring now to FIGS. 1 and 2, a typical musical instrument, such as a violin, includes a body having a belly portion 10 against which a bridge 11 is fitted at a predetermined location established by reference to markings 12–13 on the inside edges of the respective f-holes 14 and 15. The scroll 16 supports tuning pegs from which the several strings G, D, A and E are stretched over both the nut portion 17 and the bridge 11, and attached at their far ends to the tailpiece 18. Extending downwardly from the scroll is the conventional fingerboard 19 terminating in a lower end 20.

The lower end of this fingerboard serves as the reference from which the desired height of strings from the fingerboard as a whole is measured. The several strings of each instrument and of each size of such instrument require individual heights as shown, for example, by the following recommended measurements for violins:

VIOLINS

| Full-Size, mm. | Three-quarter, mm. | One-half, mm. | One-quarter, mm. |
|---|---|---|---|
| G. 4.5 | 4.0 | 3.8 | 3.5 |
| D. 5.0 | 4.5 | 4.2 | 4.0 |
| A. 4.0 | 3.5 | 3.2 | 3.0 |
| E. 3.5 | 3.0 | 2.9 | 2.8 |

As is known, bridges such as 11 generally are made of special wood and have feet at their bases for contacting the belly portion of the body, and have small grooves in the upper bridge edge spaced from each other and receiving the respective strings. Such bridges are obtainable separately and thus by following written instructions as to how to fit the bridge feet to the belly of the instrument and how to deepen the string-receiving grooves, any careful person would be able to replace a broken bridge, for example, provided he had available the tools with which to measure string heights, and also to deepen those notches. Normally, a simple rat-tail file may be employed for the latter purpose and a sheet of sand paper only is required for fitting the feet of the bridge.

With the foregoing in mind, the significance of the gauge now to be described will be readily apparent to those skilled in the art. As best shown in FIG. 3 a satisfactory form of gauge may comprise a relatively thin flat member 30 of metal having one side edge 31 adapted to contact the longitudinal outer surface of the fingerboard, and having a substantial exposed surface 32 upon which a tabular chart 33 applicable to string heights of the instrument being measured is suitably exhibited. Also carried by the surface is an arcuate scale 34, preferably calibrated in millimeters.

Pivotally mounted by means of a pin, grommet or the like 35 upon the member 30 adjacent the side edge 31 is an arm 36 which is of thin sheet form and which moves in a plane parallel to the plane of member 30 and preferably in contact therewith. The extreme upper portion of the arm forms a pointer 37 which traverses scale 34 and the center of mass of the arm is located so as to cause the arm to move clockwise, as seen in FIG. 3, when the gauge is in the prescribed position for taking a measurement. During its movement the arm does not obscure visual access to chart 33.

A string-engaging-means is attached to the arm and conveniently may comprise an integral flange 38 bent laterally from the arm 36 into a plane generally normal to the plane of the arm and having an upper edge 39 which contacts the underside of the string being measured. As will be understood, the location of edge 39 and pointer 37 and the calibration of scale 34 are such that when the gauge is positioned upon the fingerboard with flange edge 39 coinciding with the lower edge 20 of that fingerboard and the arm is allowed to fall into contact with a string, the measurement of height of that string above the fingerboard will then be read directly from scale 34 depending upon where the pointer 37 comes to rest.

As best seen in FIG. 4, the combined overall dimension of the member 30, the arm 36 and the flange 38, normal to the plane of member 30, is appreciably less than the distance between adjacent strings. Thus the gauge may be easily inserted and removed between the strings and this overall dimension will be smaller than the string spacing on the smallest instrument with which it is to be used. After once bringing the edge 31 into contact with the fingerboard, the gauge is moved toward the string under measurement until the string overlies the flange 38, after which the instrument is held in generally vertical position and the arm is permitted to fall and to engage that string.

In general, the following procedure will be employed by the person replacing a bridge. With the strings detached from the tuning pegs, a new bridge is fitted to the belly of the instrument by dressing down its feet. The first string is then attached to its peg and disposed in its appropriate groove in the new bridge and the initial measurement of string height using the gauge is obtained. Upon consulting the chart found on the gauge the user then determines how much the string needs to be lowered and this is accomplished by first detaching the string from the new bridge and deepening the groove until the string placed therein will be at the correct height. A similar procedure thereafter is followed for each of the remaining strings.

Although the gauge illustrated in FIG. 3, shows a chart applicable to only one form of instrument, it will be understood that other such charts for other instruments may be carried thereon and in fact it is a feature of the invention that a single gauge may be used for any of many different forms of stringed musical instruments. Various changes may be made in the details of construction of the gauge without departing from the spirit and scope of the invention as defined by the appended claim.

What I claim as new and desire to secure by Letters Patent of the United States is:

A gauge for measuring the height of the strings of a stringed musical instrument from its fingerboard comprising a generally flat member carrying a measurement scale on one face thereof, said member having one side edge adapted to rest against the longitudinal outer surface of the fingerboard during the taking of a measurement, a movable arm pivotally mounted upon said member adjacent said one side edge thereof and adapted to move in a plane parallel to the plane of said member, and a string-engaging means projecting generally normal to said plane of movement of said arm and carried by said arm and adapted to contact the underside of a given string of said instrument, said arm having a pointer means adapted to traverse said scale and to indicate thereon the distance of the string being measured from the fingerboard at the time said string-engaging means contacts said given string, said string-engaging means being disposed at a location between said pointer means of said arm and the pivotal engagement of said arm on said member, and said arm having its center of mass so located as to cause said arm to fall by gravity and to bring said string-engaging means into contact with said given string when said member occupies a generally vertical position upon the fingerboard.

References Cited by the Examiner
UNITED STATES PATENTS 2,391,075 12/1945 Steibel et al. _____ 33—172
2,767,475 10/1956 Sekora _____ 33—148

LEONARD FORMAN, *Primary Examiner.*

J. M. FREED, *Assistant Examiner.*